(12) United States Patent
Ferguson

(10) Patent No.: US 6,171,195 B1
(45) Date of Patent: Jan. 9, 2001

(54) APPARATUS AND METHOD FOR ALIGNING SHAFT COUPLINGS

(76) Inventor: Leslie W. Ferguson, 6143 Cluster Springs Rd., Alton, VA (US) 24520

( * ) Notice: Under 35 U.S.C. 154(b), the term of this patent shall be extended for 0 days.

(21) Appl. No.: 09/260,710

(22) Filed: Mar. 1, 1999

(51) Int. Cl.[7] ................................ F16D 3/48
(52) U.S. Cl. ................ 464/137; 464/179; 403/337; 403/343; 403/13; 29/272; 411/513; 411/354
(58) Field of Search ................ 464/179, 137; 29/272; 411/354, 513; 403/337, DIG. 8, 343, 13

(56) References Cited

U.S. PATENT DOCUMENTS

| 643,081 | * | 2/1900 | Bullock | 464/56 |
| 1,936,573 | * | 11/1933 | Anger | 464/137 |
| 5,004,017 | * | 4/1991 | White | 138/106 |
| 5,139,400 | * | 8/1992 | Ide | 418/48 |
| 5,387,047 | * | 2/1995 | Korpi | 403/3 |

FOREIGN PATENT DOCUMENTS

| 53-020043 | * | 2/1978 | (JP) | 464/137 |

\* cited by examiner

*Primary Examiner*—Lynne H. Browne
*Assistant Examiner*—Aaron Dunwoody
(74) *Attorney, Agent, or Firm*—Adams, Schwartz & Evans, P.A.

(57) ABSTRACT

An apparatus for precisely aligning bolt holes in first and second adjacent drive shaft couplings, including a cam pin for being positioned in the generally aligned bolt holes in the shaft couplings and rotated to bring the bolt holes in to more precise alignment. The cam pin includes a first, relatively large diameter segment having a cylindrical wall defining a first longitudinal axis for being positioned in a precisely fitting condition in the bolt hole of the first coupling, and a second, relatively small diameter segment having a cylindrical wall defining a second longitudinal axis offset from and eccentric to the longitudinal axis of the first segment for being relatively loosely positioned in the generally aligned bolt hole of the second coupling. A cam sleeve is provided for being positioned in axial and rotational sliding relation over the small diameter segment of the cam pin and within the bolt hole of the second coupling. The cam sleeve has an offset bore defining a progressively varying wall thickness whereby rotation of the cam pin and cam sleeve relative to each other and to the bolt holes within which they are positioned brings progressively varies the overall diameter of the cam pin to bring the bolt holes into precise alignment for installation of the connecting bolts.

7 Claims, 5 Drawing Sheets

APPARATUS AND METHOD FOR ALIGNING SHAFT COUPLINGS

TECHNICAL FIELD BACKGROUND OF THE INVENTION

This invention relates to an apparatus and method for aligning couplings of rotating shafts, particularly large, high speed shafts such as used in electric power plants and other large industrial operations. Manufacturers of high speed rotating equipment provide specifications for desired alignment and limits of deviation. Operation outside of these recommended norms can cause damage to equipment, vibration and other problems. Manufacturers also require a process that rotates both shafts to record the alignment relationship between the two rotors. Each rotor can be rotated separately or the rotors can be temporarily connected with soft metal pins. The rotation of each coupling separately requires additional time to rotate each rotor. Connecting pins cause deflection of the couplings due to binding with time required to free the pins. Neither process will stop the coupling rims with the correct degree position to allow use of new laser alignment tooling that is now available. The cam pin according to the present invention, when used without the cam sleeve according to the present invention, provides a process to record coupling alignment readings that are free of errors due to deflection of the couplings and stops the rims with the degree of relationship required for the use of laser tooling. The cam pin and sleeve used together provides a process that is safer and faster than the other processes. Prior art methods include use of a crane to rotate the shafts, and while this process can be acceptable from an accuracy standpoint, the process can frequently cause accidents. The time required to complete alignment and assemble couplings effects the time the equipment is out of service, and should therefore be reduced to a minimum. Another prior art device, referred to as a "Hutter" turning pin, uses a pin which is split so that it separates into two halves for insertion and removal from the rotor couplings for aligning the rotors. A Hutter coupling runout eliminator pin corrects differential runout prior to line boring and aligns coupling bolt holes in a manner similar to the turning pins.

Use of the cam pin and sleeve according to the invention shortens the time that equipment must be out of service for alignment.

With tandem rotors, all of the rotors can be connected with a cam pin in each coupling and the shafts all rotated together. The cam pins are unlocked at each data point to assure that the data is not corrupted by binding, and then locked again for the next rotation. The rotors can be rotated with drive equipment supplied by the manufacturer or any other suitable device that can impart slow, even rotation to the rotors.

SUMMARY OF THE INVENTION

Therefore, it is an object of the invention to provide a cam pin for aligning couplings of rotatable shafts.

It is another object of the invention to provide a cam pin which can be used for taking alignment data points off of couplings of rotatable shafts.

It is another object of the invention to provide a cam pin which can be used in combination with a rotatable cam sleeve to achieve highly accurate alignment of couplings of rotatable shafts.

It is another object of the invention to provide a method of using a cam pin with or without a cam sleeve to achieve the foregoing objects.

These and other objects of the present invention are achieved in the preferred embodiments disclosed below by providing an apparatus for precisely aligning bolt holes in first and second adjacent drive shaft couplings, comprising a cam pin for being positioned in the generally aligned bolt holes in the shaft couplings and rotated to bring the bolt holes in to more precise alignment. The cam pin includes a first, relatively large diameter segment having a cylindrical wall defining a first longitudinal axis for being positioned in a precisely fitting condition in the bolt hole of the first coupling, and a second, relatively small diameter segment having a cylindrical wall defining a second longitudinal axis offset from and eccentric to the longitudinal axis of the first segment for being relatively loosely positioned in the generally aligned bolt hole of the second coupling. A cam sleeve is provided for being positioned in axial and rotational sliding relation over the small diameter segment of the cam pin and within the bolt hole of the second coupling. The cam sleeve has an offset bore defining a progressively varying wall thickness whereby rotation of the cam pin and cam sleeve relative to each other and to the bolt holes within which they are positioned brings progressively varies the overall diameter of the cam pin to bring the bolt holes into precise alignment for installation of the connecting bolts.

Preferably, the cam pin includes rotation means for aiding in rotation of the cam pin in the bolt holes.

According to one preferred embodiment of the invention, the rotation means comprises a hexagonal end cap positioned on one end for receiving a suitably-sized hex wrench.

According to another preferred embodiment of the invention, the hexagonal end cap is positioned on the large diameter segment of the cam pin.

According to yet another preferred embodiment of the invention, the cam pin includes a stop collar for being positioned on the large diameter segment of the cam pin for preventing damage to the coupling.

According to yet another preferred embodiment of the invention, a cam pin is provided for precisely aligning bolt holes in first and second adjacent drive shaft couplings, and comprises a cam pin for being positioned in generally aligned bolt holes in the shaft couplings and rotated to bring the bolt holes in to more precise alignment. The cam pin includes a first, relatively large diameter segment having a cylindrical wall defining a first longitudinal axis for being positioned in a precisely fitting condition in the bolt hole of the first coupling, and a second, relatively small diameter segment having a cylindrical wall defining a second longitudinal axis offset from and eccentric to the longitudinal axis of the first segment for being relatively loosely positioned in the generally aligned bolt hole of the second coupling. Rotation of the cam pin within the bolt holes within which it is positioned progressively varies the overall diameter of the cam pin to bring the bolt holes into alignment for installation of the connecting bolts.

A method for precisely aligning bolt holes in first and second adjacent drive shaft couplings in accordance with a preferred embodiment of the invention comprises the steps of positioning a cam pin into generally aligned bolt holes in the shaft couplings. The cam pin includes a first, relatively large diameter segment having a cylindrical wall defining a first longitudinal axis for being positioned in a precisely fitting condition in the bolt hole of the first coupling, and a second, relatively small diameter segment having a cylindrical wall defining a second longitudinal axis offset from and eccentric to the longitudinal axis of the first segment for being relatively loosely positioned in the generally aligned bolt hole of the second coupling. The cam pin is rotated within the bolt holes to bring the bolt holes in to more precise alignment.

According to yet another preferred embodiment of the invention, the method includes the further step of positioning a cam sleeve in axial and rotational sliding relation over the small diameter segment of the cam pin and within the bolt hole of the second coupling, said cam sleeve having an offset bore defining a progressively varying wall thickness, and rotating the cam pin and cam sleeve relative to each other and to the bolt holes within which they are positioned to progressively vary the overall diameter of the cam pin and thereby bring the bolt holes into precise alignment for installation of the connecting bolts.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
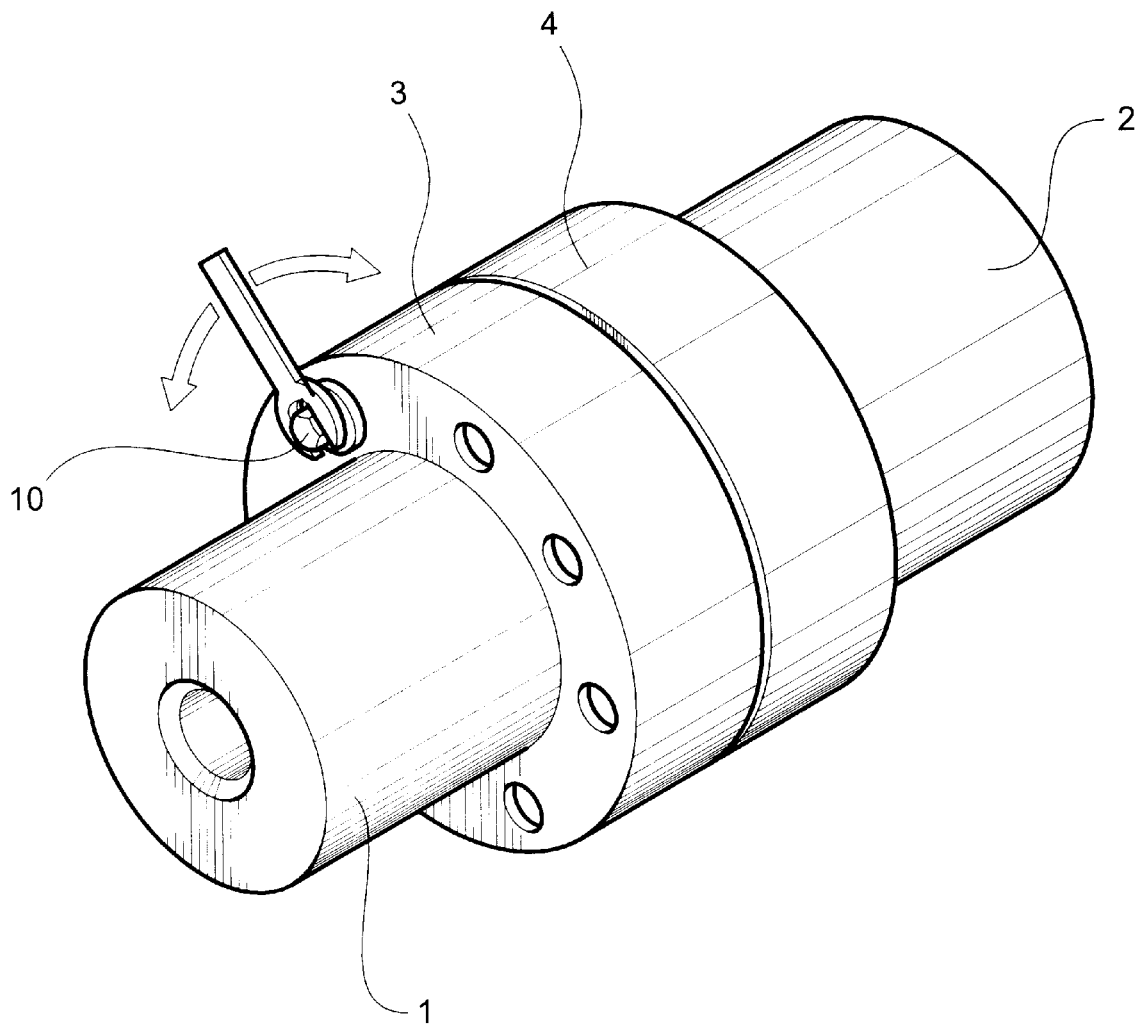
FIG. 1 is a perspective view of a pair of shafts in coupled relation with a cam pin according to an embodiment of the invention in one pair of aligned bolt holes.

Referring now specifically to the drawings, FIG. 1 illustrates a typical arrangement whereby two aligned, rotatable shafts, such as power plant turbine shafts, 1 and 2 are joined by respective enlarged end couplings 3 and 4. Each of the end couplings 3 and 4 include axially-extending bolt holes 5 spaced at regular intervals around their respective peripheries. During operation, the couplings 3 and 4 are joined by bolts extended through aligned ones of the bolt holes 5 and secured by properly torqued bolts (not shown) in a conventional manner. As is also shown in FIG. 1, a cam pin 10 according to the present invention is positioned in one selected pair of bolt holes and manipulated in the manner disclosed below.

Figure 2:
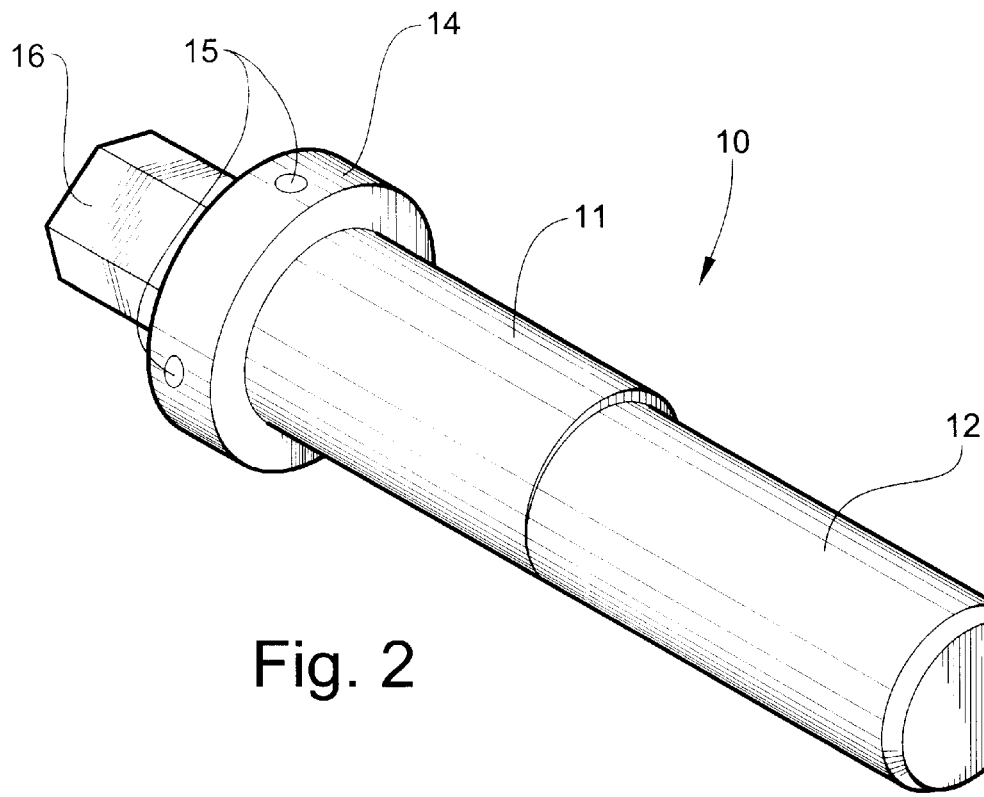
FIG. 2 is a first perspective view of a cam pin according to an embodiment of the invention.
Figure 3:
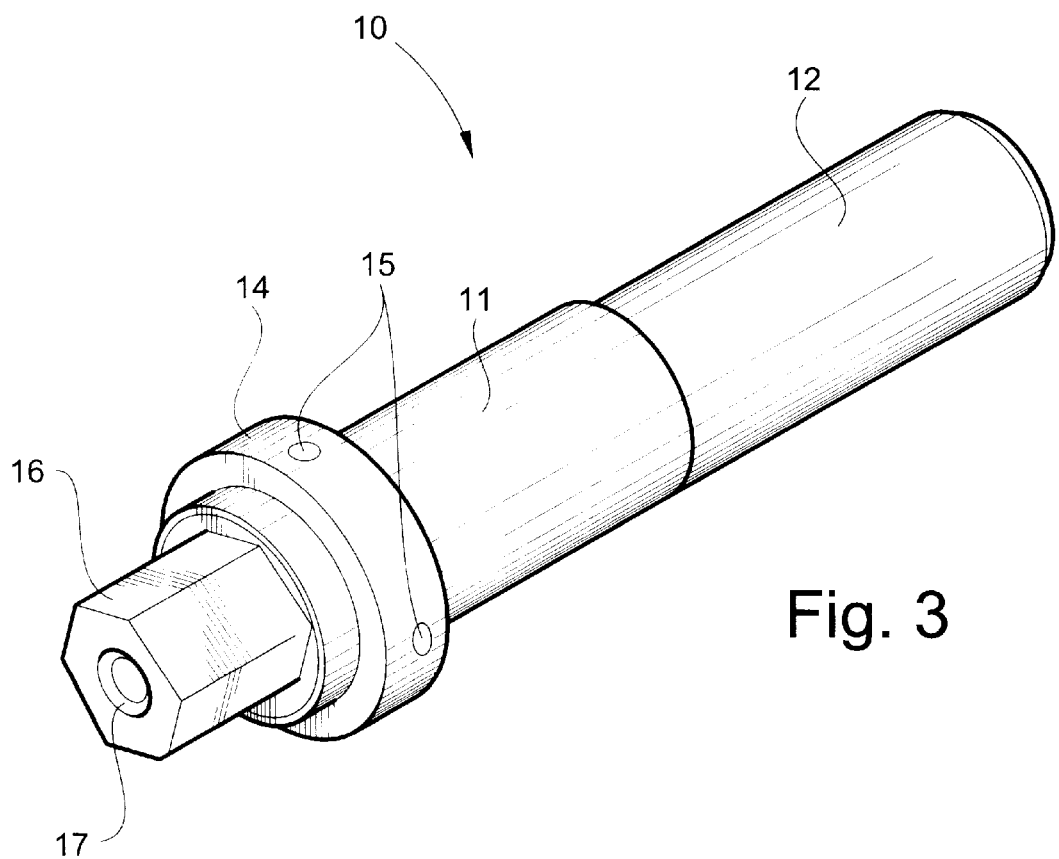
FIG. 3 is a second perspective view of the cam pin according to an embodiment of the invention shown in FIG. 2.

Referring now to FIGS. 2 and 3, cam pin 10 includes a first, relatively large diameter segment 11 having a cylindrical wall which defines a first longitudinal axis. The large diameter segment 11 of the cam pin 10 is positioned in a precisely fitting condition in the bolt hole of the first coupling 3. Cam pin 10 also includes a second, relatively small diameter segment 12 having a cylindrical wall defining a second longitudinal axis offset from and eccentric to the longitudinal axis of the large diameter segment 11. The small diameter segment 12 is relatively loosely positioned in the generally aligned bolt hole of the second coupling 4. The large diameter segment 11 and the small diameter segment 12 can be separately fabricated and joined together by welding or other suitable process, or fabricated in a single piece so that the large diameter segment 11 and small diameter segment 12 are integral with each other.

Cam pin 10 also includes a stop collar 14 is positioned adjacent a distal end of the large diameter segment 11 and prevents damage to the coupling 3 by limiting the length that can be inserted into the bolt hole. The stop collar 14 is preferably separately formed and applied to the large diameter segment 11 of the cam pin 10 with machine screws 15, but may be integrally formed on the cam pin 10 during fabrication.

An end cap 16 is concentrically positioned on the distal end of the large diameter segment 11 of the cam pin 10 and is used to aid in turning the cam pin 10. While the end cap 16 can be any suitable shape, a hex-shape permits the use of conventional and readily-available hex wrenches. A threaded axial hole 17 is provided for permitting removal of the cam pin 10 from the bolt hole in the unlikely event that the cam pin 10 should become wedged in the bolt hole. For example, a pipe sleeve, threaded rod with nut and end plate could thereby be assembled on the pin for removal. Cam pin 10 has a core 10A of steel. The large diameter segment 11 is covered with a relatively soft bronze sleeve 10B. The small diameter segment 12 is covered with a bronze sleeve 10C.

Figure 4:
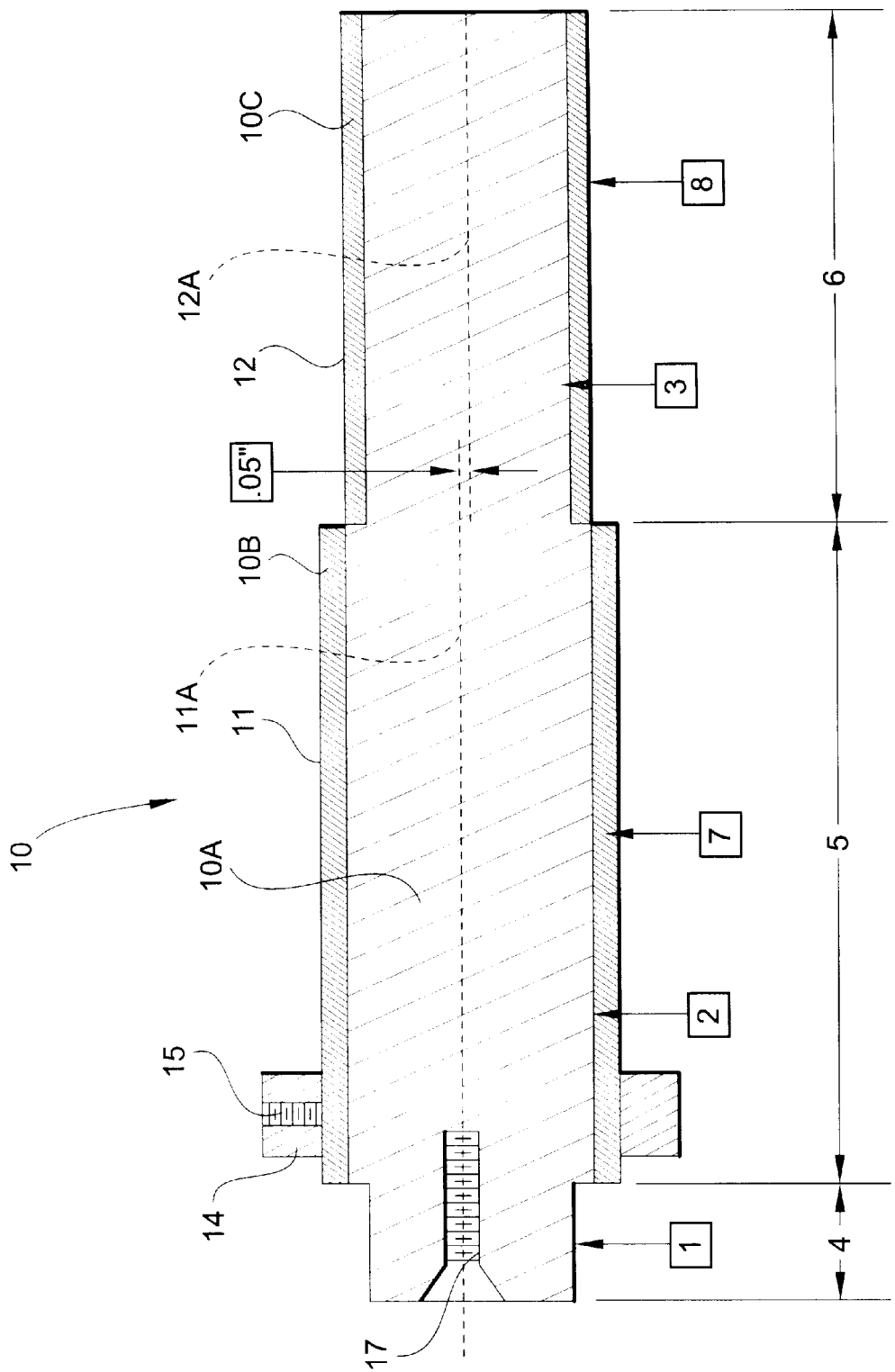
FIG. 4 is a cross-sectional view along the longitudinal axis of the cam pin.

As is generally shown in FIGS. 2 and 3, the large diameter segment 11 and small diameter segment 12 are slightly eccentric to each other. This is more specifically shown in FIG. 4 and results from a centerline offset, referenced at notional lines 11A and 12A on FIG. 4. The dimensions of an exemplary cam pin 10 shown in FIG. 4 are set out in Tables 1 and 2 for purposes of illustration for use with bolt holes having a bore 3.062 inches in diameter.

TABLE 1

(Steel Core 10A)

| Dimension Direction | Drawing Ref. | Dimension (in.) |
| --- | --- | --- |
| Radial | 1 | 2.886 |
| Radial | 2 | 2.812 |
| Radial | 3 | 2.612 |
| Axial | 4 | 2 |
| Axial | 5 | 8 |
| Axial | 6 | 6 |

TABLE 2

(Bronze Sleeve 10A)

| Dimension | Drawing Ref. | Dimension (in.) |
| --- | --- | --- |
| ID | 2 | 2.807 |
| OD | 7 | 3.052 |
| Length | 5 | 8 |

Referring to FIG. 4, drawing references 2 and 3 are milled to the specified diameter, then offset by 50 mils to form the noted eccentricity of the small diameter segment 12 relative to the large diameter segment 11. Thus, the high side of the small diameter segment 12 forms a cam with respect to the large diameter segment 11 and is positioned tangent to a radial line from the shaft center.

Figure 5:
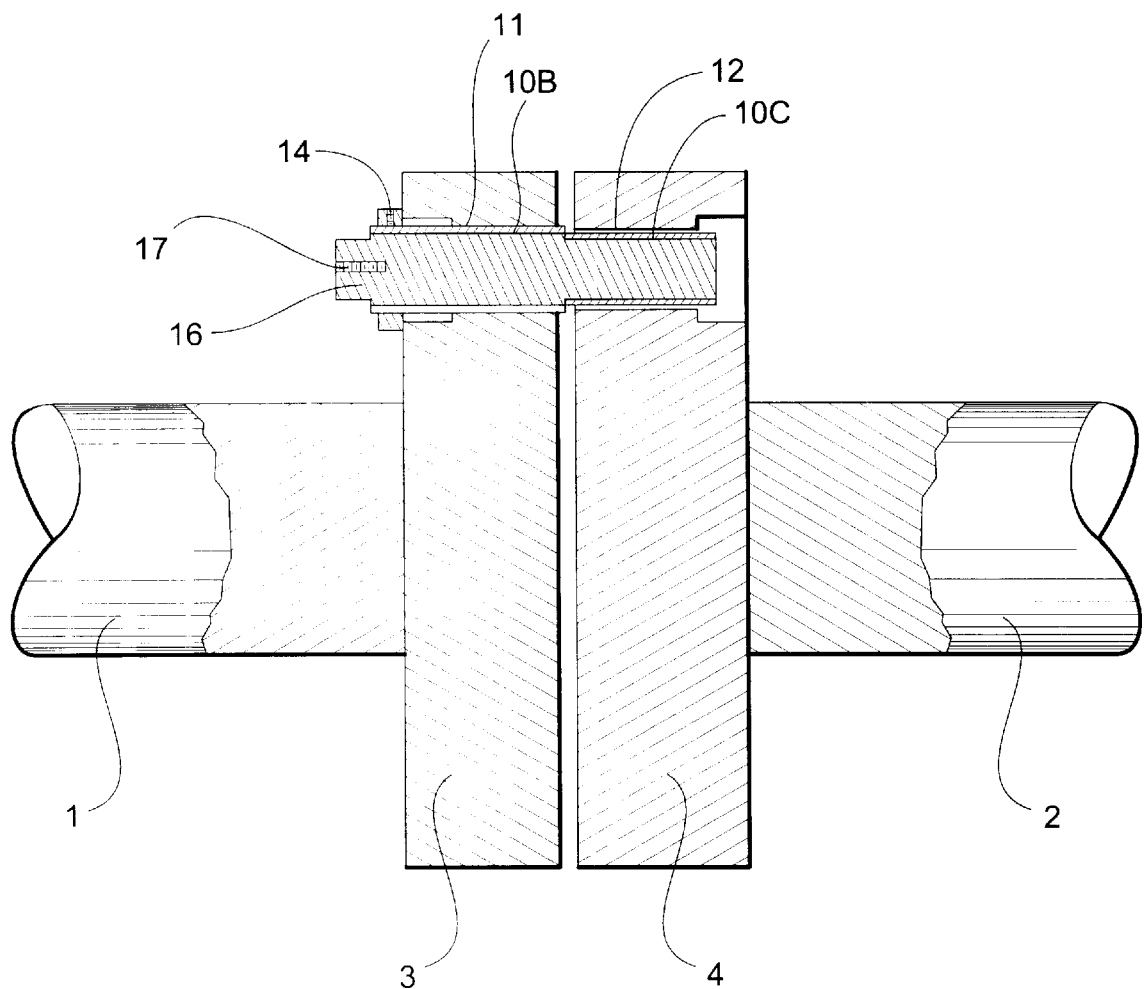
FIG. 5 is a vertical cross-sectional view of the joined couplings shown in FIG. 1.

As is indicated in FIG. 4 and shown in FIG. 5, cam pin 10 fits into the aligned bolt holes of couplings 3 and 4 with a relatively close fit between the large diameter segment 11 and the bolt hole in coupling 3, and a relatively loose fit between the small diameter segment 12 and the bolt hole in coupling 4.

Figure 6:
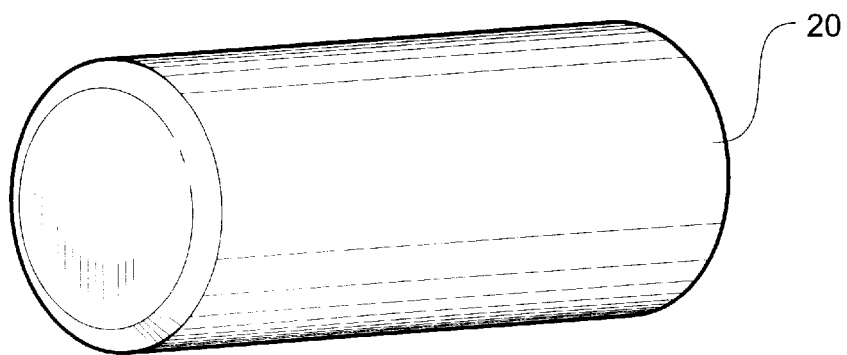
FIG. 6 is a perspective view of a cam sleeve according to an embodiment of the invention.
Figure 7:
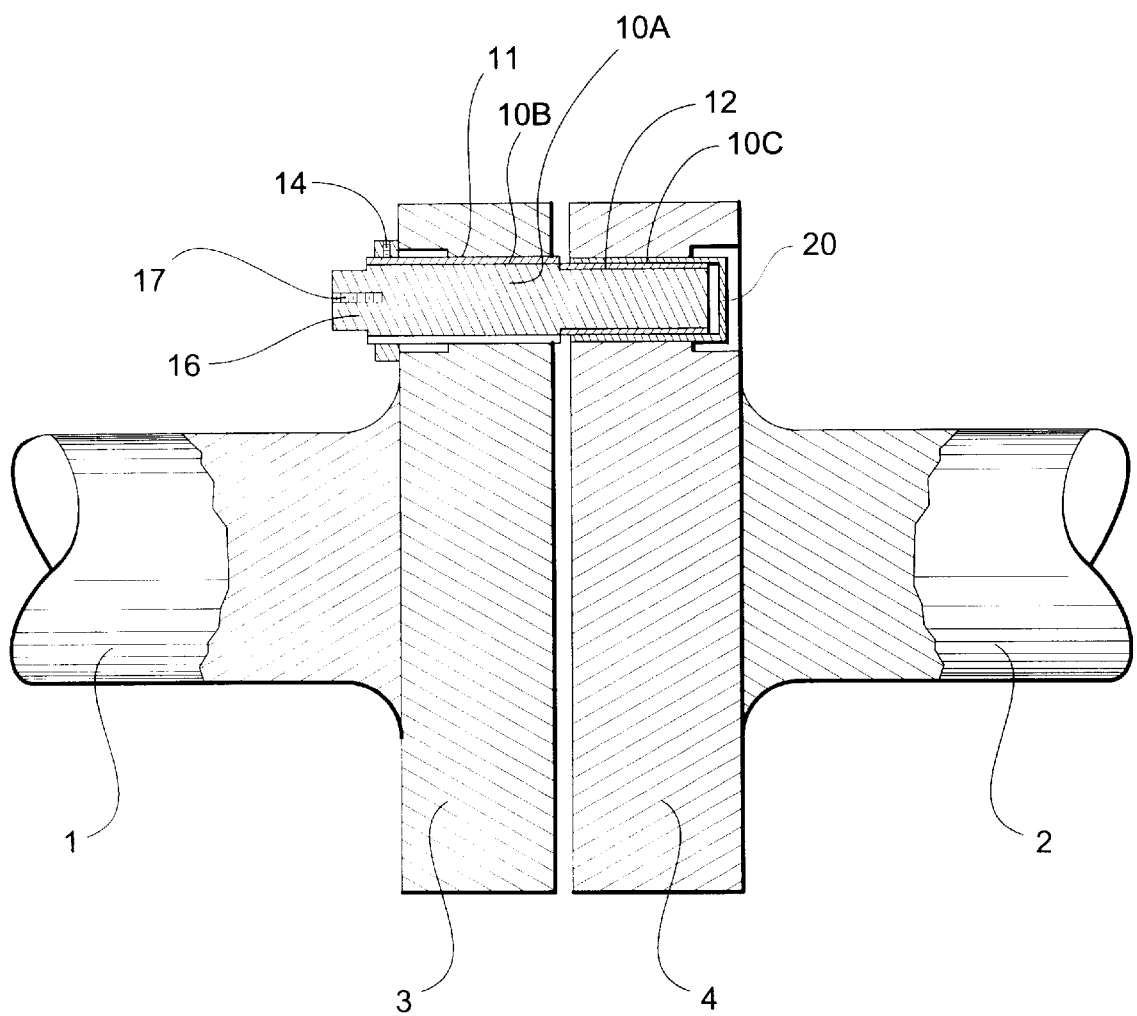
FIG. 7 is a vertical cross-sectional view of a pair of joined couplings with both a cam pin and cam sleeve positioned in one aligned pair of bolt holes according to FIG. 1.

As is shown in FIGS. 6 and 7, a bronze tubular cylindrical cam sleeve 20 is provided for being fitted over the small diameter segment 12 of the cam pin 10. The cam sleeve 20 is designed to fit closely over the small diameter segment 12 of the cam pin 10, but yet be easily rotatable thereon.

The dimensions of an exemplary cam sleeve 20 shown in FIGS. 6 and 7 are set out in Table 3 for purposes of illustration for use with bolt holes having a bore 3.062 inches in diameter.

TABLE 3

(Cam Sleeve 20)

| Dimension | Drawing Ref. | Dimension (in.) |
| --- | --- | --- |
| ID | 3 | 2.607 |
| OD | 8 | 2.852 |
| Length | 5 | 6 |

The OD of the cam sleeve 20 is milled to be 50 mils smaller than the diameter of the bolt hole in the coupling 4, with the ID 50 mils larger than the small diameter segment 12 of the cam pin 10. The thickness of the walls of the cam sleeve 20 varies from a minimum of 40 mils to a maximum of 60 mils. The centerline of the ID of the cam sleeve 20 is offset 10 mils from the centerline of the OD.

In use, the bolt holes of the couplings 3 and 4 are first brought into general alignment. When the coupling 3, the coupling with the large diameter segment 11 fitted therein, is supplying the driving force, the high side of the cam surface of the small diameter segment 12 should be positioned in direction of rotation or high side. When the coupling 4 is supplying the driving force, the high side of the cam is positioned trailing the rotation, or on the low side. The cam pin 10 will precisely hold the pitch constant between the couplings 3 and 4 when the shafts 1 and 2 are rotated.

The cam pin 10 can be rotated to obtain clearance between the cam end and the mating hole. This eliminates shaft deflections that inject error in shaft alignment measurements. Maximum clearance between the cam pin 10 and the bolt holes will occur at approximately 180 degree cam pin rotation, but the cam pin 10 may need to be rotated only to a slight degree to obtain clearance. Once the cam pin 10 has been rotated to a degree sufficient to bring the bolt holes into closer alignment, the cam sleeve 20 is installed onto the small diameter segment 12 of the cam pin 10. The cam pin 10 is rotated in combination with the cam sleeve 20 to precisely position the coupling halves 3 and 4 for bolt installation. The cam sleeve 20 may be rotated with the cam pin 10 or relative to the cam pin 10, thus providing a virtually infinite degree of precise variation in position necessary to achieve a correspondingly precise degree of alignment between the coupling halves 3 and 4.

Of course, cam pins can be sized for use with any size shaft, coupling or bolt hole consistent with the principles set out in this application.

An apparatus and method for aligning shaft couplings is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An apparatus for precisely aligning bolt holes in first and second adjacent drive shaft couplings preparatory to receiving bolts therein, comprising:
    (a) a cam pin for being positioned in generally aligned bolt holes in the shaft couplings and rotated to bring the bolt holes into more precise alignment;
        (i) said cam pin including a first, relatively large diameter segment having a cylindrical wall defining a first longitudinal axis for being positioned in a closely fitting condition in the bolt hole of the first coupling; and
        (ii) a second, relatively small diameter segment having a cylindrical wall defining a second longitudinal axis offset from and eccentric to the longitudinal axis of the first segment for being relatively loosely positioned in the generally aligned bolt hole of the second coupling;
    (b) a cam sleeve for being positioned in axial and rotational sliding relation over the small diameter segment of the cam pin and within the bolt hole of the second coupling, said cam sleeve having an offset bore defining a progressively varying wall thickness;
    (c) whereby rotation of the cam pin and cam sleeve relative to each other and to the bolt holes within which they are positioned progressively varies the overall diameter of the cam pin and cam sleeve to bring the bolt holes into precise alignment for installation of the bolts in the bolt holes.

2. A cam pin according to claim 1, wherein the cam pin includes rotation means for aiding in rotation of the cam pin in the bolt holes.

3. A cam pin according to claim 2, wherein the rotation means comprises a hexagonal end cap positioned on one end for receiving a suitably-sized hex wrench.

4. A cam pin according to claim 3, wherein the hexagonal end cap is positioned on the large diameter segment of the cam pin.

5. A cam pin according to claim 1, wherein the cam pin includes a stop collar for being positioned on the large diameter segment of the cam pin for preventing damage to the coupling.

6. A cam pin for precisely aligning bolt holes in first and second adjacent drive shaft couplings preparatory to receiving bolts therein by being positioned in generally aligned bolt holes in the shaft couplings and rotated to bring the bolt holes in to more precise alignment, said cam pin including:
    (a) a first, relatively large diameter segment having a cylindrical wall defining a first longitudinal axis for being positioned in a precisely fitting condition in the bolt hole of the first coupling; and
    (b) a second, relatively small diameter segment having a cylindrical wall defining a second longitudinal axis offset from and eccentric to the longitudinal axis of the first segment for being relatively loosely positioned in the generally aligned bolt hole of the second coupling;
    whereby rotation of the cam pin within the bolt holes within which it is positioned progressively varies the overall diameter of the cam pin to bring the bolt holes into more precise alignment.

7. A cam pin according to claim 6, and including a cam sleeve for being positioned in axial and rotational sliding relation over the small segment of the cam pin and within the bolt hole of the second coupling, said cam sleeve having an offset bore defining a progressively varying wall thickness, whereby rotation of the cam pin and cam sleeve relative to each other and to the bolt holes within which they are positioned progressively varies the overall diameter of the cam pin to bring the bolt holes into precise alignment for installation of the connecting bolts.

* * * * *